United States Patent
Servajean et al.

(10) Patent No.: US 11,509,671 B2
(45) Date of Patent: *Nov. 22, 2022

(54) ANOMALY DETECTION IN COMPUTER NETWORKS

(71) Applicant: British Telecommunications Public Limited Company, London (GB)

(72) Inventors: Maximilien Servajean, London (GB); Yipeng Cheng, London (GB)

(73) Assignee: British Telecommunications Public Limited Company, London (GB)

(*) Notice: Subject to any disclaimer, the term of this patent is extended or adjusted under 35 U.S.C. 154(b) by 390 days.

This patent is subject to a terminal disclaimer.

(21) Appl. No.: 16/619,767

(22) PCT Filed: Jun. 8, 2018

(86) PCT No.: PCT/EP2018/065211
§ 371 (c)(1),
(2) Date: Dec. 5, 2019

(87) PCT Pub. No.: WO2018/224669
PCT Pub. Date: Dec. 13, 2018

(65) Prior Publication Data
US 2020/0106795 A1    Apr. 2, 2020

(30) Foreign Application Priority Data
Jun. 9, 2017    (EP) ..................... 17175329

(51) Int. Cl.
*H04L 9/40*    (2022.01)
*G06N 20/00*    (2019.01)
(Continued)

(52) U.S. Cl.
CPC ....... *H04L 63/1425* (2013.01); *G06N 3/0454* (2013.01); *G06N 20/00* (2019.01); *G06N 20/10* (2019.01); *H04L 63/1416* (2013.01)

(58) Field of Classification Search
CPC ............. H04L 63/1425; H04L 63/1416; H04L 2463/144; G06N 3/0454; G06N 20/00; G06N 20/10; G06N 3/084
(Continued)

(56) References Cited

U.S. PATENT DOCUMENTS 7,181,768 B1    2/2007    Ghosh et al.
8,306,931 B1    11/2012    Bowman et al.
(Continued)

FOREIGN PATENT DOCUMENTS

| EP | 2833594 A1 | 2/2015 | |
|----|-----------|--------|--|
| EP | 3016033 A1 | 5/2016 | |
| WO | WO-2018224670 A1 * | 12/2018 | ........... G06K 9/6218 |

OTHER PUBLICATIONS

Application and Filing Receipt for U.S. Appl. No. 17/593,800, filed Sep. 24, 2021, 304 pages.
(Continued)

*Primary Examiner* — Badri Champakesan
(74) *Attorney, Agent, or Firm* — Patterson Thuente IP

(57) ABSTRACT

A method of anomaly detection for network traffic communicated by devices via a computer network, the method including receiving a set of training time series each including a plurality of time windows of data corresponding to network communication characteristics for a first device; training an autoencoder for a first cluster based on a time series in the first cluster, wherein a state of the autoencoder is periodically recorded after a predetermined fixed number of training examples to define a set of trained autoencoders for the first cluster; receiving a new time series including a plurality of time windows of data corresponding to network communication characteristics for the first device; for each time window of the new time series, generating a vector of reconstruction errors for the first device for each autoencoder based on testing the autoencoder with data from the
(Continued)

time window; and evaluating a derivative of each vector; training a machine learning model based on the derivatives so as to define a filter for identifying subsequent time series for a second device being absent anomalous communication.

3 Claims, 2 Drawing Sheets

(51) Int. Cl.
  *G06N 3/04* (2006.01)
  *G06N 20/10* (2019.01)
(58) Field of Classification Search
  USPC .......................................................... 726/23
  See application file for complete search history.

(56) References Cited

U.S. PATENT DOCUMENTS

| | | | |
|---|---|---|---|
| 8,402,543 B1 | 3/2013 | Ranjan et al. | |
| 9,189,623 B1* | 11/2015 | Lin | G06Q 30/00 |
| 10,289,471 B2* | 5/2019 | Cheng | G06F 11/079 |
| 10,931,692 B1* | 2/2021 | Mota | H04L 63/1425 |
| 2010/0027432 A1 | 2/2010 | Gopalan et al. | |
| 2013/0100849 A1 | 4/2013 | Szabo et al. | |
| 2015/0128263 A1* | 5/2015 | Raugas | H04L 63/1433 |
| | | | 726/23 |
| 2016/0127405 A1 | 5/2016 | Kasahara | |
| 2016/0155136 A1* | 6/2016 | Zhang | G06N 3/0454 |
| | | | 705/7.29 |
| 2016/0210556 A1 | 7/2016 | Ben Simhon et al. | |
| 2016/0219067 A1* | 7/2016 | Han | H04L 63/1425 |
| 2016/0306971 A1 | 10/2016 | Anderson et al. | |
| 2016/0330225 A1* | 11/2016 | Kroyzer | H04L 63/1425 |
| 2016/0371170 A1 | 12/2016 | Salunke et al. | |
| 2017/0169357 A1* | 6/2017 | Caspi | H04L 43/062 |
| 2017/0206464 A1* | 7/2017 | Clayton | G06N 3/0454 |
| 2018/0006900 A1* | 1/2018 | Korycki | H04L 43/00 |
| 2019/0334784 A1* | 10/2019 | Kvernvik | H04W 24/08 |
| 2020/0175161 A1 | 6/2020 | Giaconi | |
| 2020/0210782 A1* | 7/2020 | Servajean | G06K 9/6218 |
| 2020/0220892 A1 | 7/2020 | Gibson | |
| 2020/0296121 A1 | 9/2020 | El-Moussa et al. | |
| 2020/0302052 A1 | 9/2020 | El-Moussa et al. | |
| 2020/0327404 A1* | 10/2020 | Miotto | G06N 3/0481 |
| 2022/0092177 A1 | 3/2022 | Herwono et al. | |
| 2022/0092178 A1 | 3/2022 | Herwono et al. | |

OTHER PUBLICATIONS

Application and Filing Receipt for U.S. Appl. No. 17/593,802, filed Sep. 24, 2021, 314 Pages.
Application and Filing Receipt for U.S. Appl. No. 17/593,805, filed Sep. 24, 2021, 377 pages.
Araya D.B., et al., "Collective Contextual Anomaly Detection Framework For Smart Buildings," 2016 International Joint Conference on Neural Networks (IJCNN), IEEE, Jul. 24, 2016, pp. 511-518.
Communication pursuant to Article 94(3) EPC For European Application No. 18728426.0, dated Mar. 22, 2021, 5 pages.
Erfani S M., et al., "High-dimensional and large-scale anomaly detection using a linear one-class SVM with deep learning," 2016, 14 pages.
Extended European search report For EP Application No. 17175329. 6, dated Oct. 27, 2017, 9 pages.
Extended European search report For EP Application No. 17175330. 4, dated Aug. 24, 2017, 11 pages.
International Preliminary Report on Patentability for Application No. PCT/EP2018/065212, dated Dec. 19, 2019, 10 pages.
International Preliminary Reporton Patentability for Application No. PCT/EP2018/065211, dated Dec. 19, 2019, 8 pages.
International Search Report and Written Opinion for Application No. PCT/EP2018/065211, dated Jul. 31, 2018, 10 pages.
International Search Report and Written Opinion for Application No. PCT/EP2018/065212, dated Aug. 3, 2018, 12 pages.
Janakiraman V.M., et al., "Anomaly Detection In Aviation Data Using Extreme Learning Machines," 2016 International Joint Conference on Neural Networks (IJCNN), IEEE, Jul. 24, 2016, pp. 1993-2000.
Jinwon A., et al., "Variational Autoencoder based Anomaly Detection using Reconstruction Probability," Progress in Biomedical Optics and Imaging, SNU Data Mining Center, 2015-2 Special Lecture on IE, Dec. 27, 2015, XP055491966, ISSN: 1605-7422, ISBN: 978-1-5106-0027-0, 18 pages.
Malhotra P., "Long Short Term Memory Networks for Anomaly Detection in Time Series," 2015, 6 pages.
Office Action For GB Application No. 1709231.3, dated Nov. 28, 2017, 5 pages.
Office Action For GB Application No. 1709228.9, dated Nov. 16, 2017, 1 page.

* cited by examiner

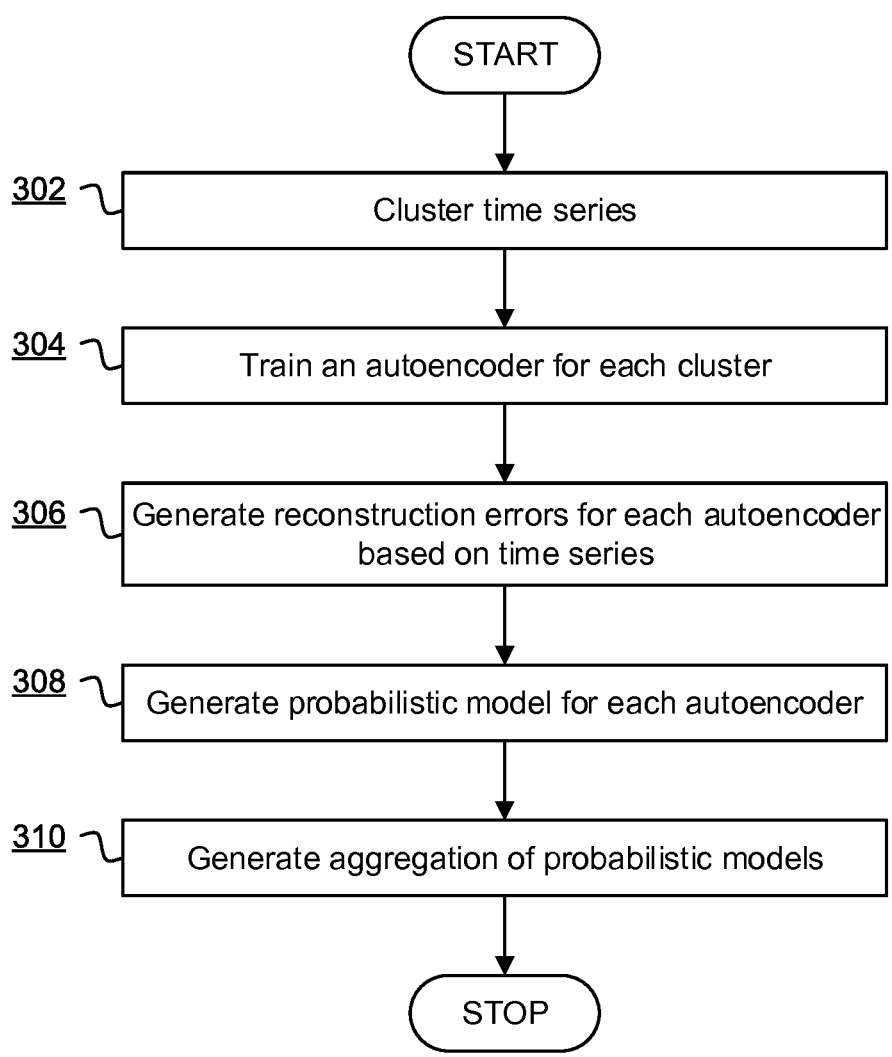

ANOMALY DETECTION IN COMPUTER NETWORKS

CROSS-REFERENCE TO RELATED APPLICATIONS

The present application is a National Phase entry of PCT Application No. PCT/EP2018/065211, filed Jun. 8, 2018, which claims priority from European Patent Application No. 17175329.6 filed Jun. 9, 2017, each of which is fully incorporated herein by reference.

TECHNICAL FIELD

The present disclosure relates to the detection of anomalies in communication on computer networks.

BACKGROUND

Increasing threats to network connected devices such as computer systems and networking appliances heighten a need to identify potentially threatening, malicious, erroneous or suspicious network traffic communicated via a computer network. Such traffic can be said to be anomalous where it is not consistent with traffic arising in the normal, accepted and/or expected operation of network connected devices.

Anomaly detection largely relies on feature extraction using techniques such as principal component analysis and mechanisms for learning normal network traffic characteristics, such as through the use of one-class support vector machines (SVMs). However, such models of normal traffic can suffer from overfitting relatively variable network communication (such as might be expected in the content of traffic communicated to a domain name server, for example) so reducing sensitivity to anomalies. Alternatively, such models can underfit network traffic by reflecting relatively consistent traffic such that sensitivity to anomalies is excessive and includes an excessive number of false-positive determinations of anomalous traffic.

SUMMARY

Thus, there is a need to address these challenges while improving the identification of anomalies in network traffic.

The present disclosure accordingly provides, in a first aspect, a method of anomaly detection for network traffic communicated by devices via a computer network, the method comprising: receiving a set of training time series each including a plurality of time windows of data corresponding to network communication characteristics for a device; training an autoencoder for the first cluster based on time series in the cluster, wherein a state of the autoencoder is periodically recorded after a predetermined fixed number of training examples to define a set of trained autoencoders for the cluster; receiving a new time series including a plurality of time windows of data corresponding to network communication characteristics for a device; for each time window of the new time series, generating a vector of reconstruction errors for the device for each autoencoder based on testing the autoencoder with data from the time window; evaluating a derivative of each vector; training a machine learning model based on the derivatives so as to define a filter for identifying subsequent time series for a device being absent anomalous communication.

The present disclosure accordingly provides, in a second aspect, a computer system including a processor and memory storing computer program code for performing the method set out above.

The present disclosure accordingly provides, in a third aspect, a computer program element comprising computer program code to, when loaded into a computer system and executed thereon, cause the computer to perform the method set out above.

BRIEF DESCRIPTION OF THE DRAWINGS

Embodiments of the present disclosure will now be described, by way of example only, with reference to the accompanying drawings, in which:

FIG. 3 is a flowchart of a method of anomaly detection for network traffic communicated by devices via a computer network according to embodiments of the present disclosure.

DETAILED DESCRIPTION OF THE DRAWINGS

Figure 1:
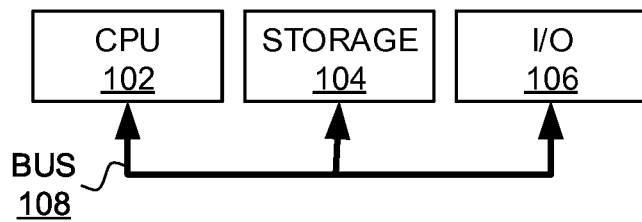
FIG. 1 is a block diagram illustrating computer systems executing in virtualized computing environments under control of a botnet controller.

FIG. 1 is a block diagram of a computer system suitable for the operation of embodiments of the present disclosure. A central processor unit (CPU) 102 is communicatively connected to a storage 104 and an input/output (I/O) interface 106 via a data bus 108. The storage 104 can be any read/write storage device such as a random access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Figure 2:
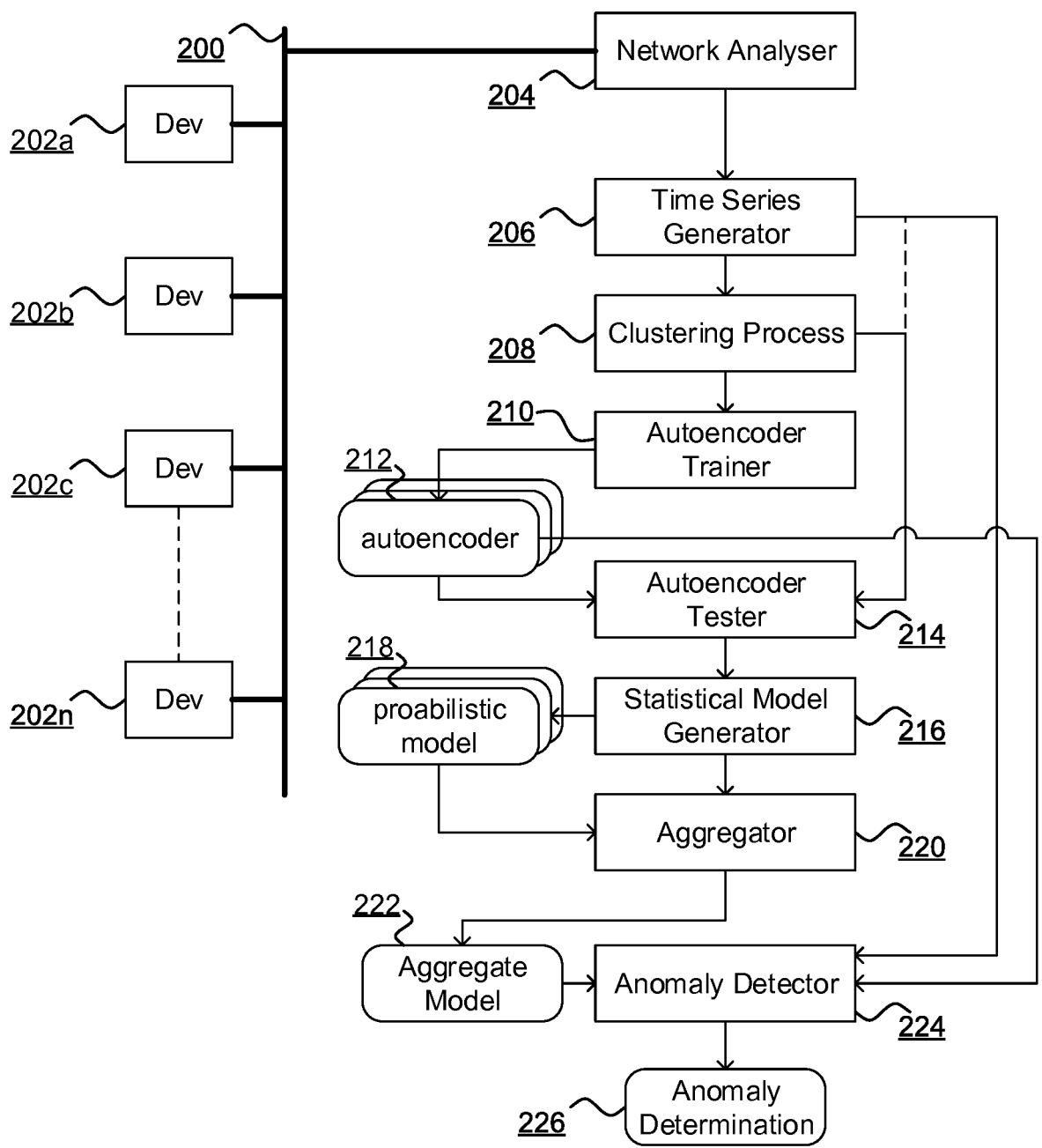
FIG. 2 is a component diagram of an arrangement for detecting anomalies in network traffic according to embodiments of the present disclosure.

FIG. 2 is a component diagram of an arrangement for detecting anomalies in network traffic according to embodiments of the present disclosure. A computer network 200, such as a wired, wireless, local, wide-area or any other suitable network, has communicatively connected devices 202a-202n such as, inter alia, computer systems, network appliances, pervasive devices, sensors, detectors, virtual computer systems etc. For example, devices 202a-202n can include one or more network appliances such as: a proxy; a firewall; a domain name server (DNS); a router; a gateway; a software appliance such as an intrusion detection and/or protection service; and other such appliances as will be familiar to those skilled in the art.

In use, devices communicate via the network 200 using one or more protocols for network communication. A network analyzer 204 is a hardware, software, firmware or combination component adapted to access and store information about network communication via the network 200. For example, NetFlow is a network facility developed by Cisco for collecting internet protocol (IP) traffic information and monitoring network traffic. Thus, the network analyzer 204 can identify one or more of: ingress/egress interface information for a communication; source/destination network address information such as IP address information; protocol information; port information; network protocol service information; network communication metrics such as size, duration, numbers of packets, packet sizes etc.; and other information as will be apparent to those skilled in the art. Alternative network analysis methods can be employed including bespoke analysis. The network analyzer 204 associates network data with a device 202a-202n connected with the network such that characteristics of the network data for the device can be determined. Example characteristics can include: a number of outgoing connections from the device; a number of distinct ports for outgoing connections; an average duration of a connection; an average number of bytes exchanged; and other characteristics as will be apparent to those skilled in the art. Such characteristics can be selected to reflect promising basis for identifying malicious, erroneous, or suspicious communications, for example.

A time series generator 206 is a hardware, software, firmware or combination component for generating a time series of network characteristics for each of a plurality of network connected devices 202. Each time series is defined by grouping network characteristics for each of a series of fixed length time windows, most consecutive time windows, for each of which a set of network characteristics are identified based on the output of the network analyzer 204. Thus, a set of time series is generated, each for a different device 202, and each comprising characteristics over fixed length time windows.

A clustering process 208 is performed to cluster the set of time series into a plurality of clusters each constituting a subset of the set. In one embodiment, each cluster is defined based on a random division of the set of time series. In another embodiment, each cluster is defined based on an autoencoder as input to a clustering algorithm such as k-means. For example, an autoencoder can be employed to convert a time series to a feature vector on which basis clustering is performed. Thus, for the set of time series each time series can be converted to a feature vector as input to a clustering algorithm such as k-means. In this way time series with common features determined by the autoencoder can be clustered together. In one embodiment, such clustering results in devices 202 having similar network communication characteristics being clustered together.

An autoencoder trainer 210 is a hardware, software, firmware or combination component for training an autoencoder 212 for each cluster defined by the clustering process 208 such that each cluster has a separately trained autoencoder 212. Thus, an autoencoder 212 is trained for a cluster based on each of the time series in the cluster on a time window by time window basis. The autoencoder trainer 210 operates on the basis of time series generated as training data, such as time series defined on the basis of network communication that is known to reflect normal, typical, non-suspicious and/or safe communication unencumbered by malicious, erroneous or suspicious network traffic or entities. Thus, such time series can be referred to as training time series.

Subsequently, an autoencoder tester 216, as a hardware, software, firmware or combination component, applies time series from the training time series to each autoencoder 212 to identify a set of reconstruction errors for each autoencoder 212. Thus, a time series from the training time series can be processed by an autoencoder to determine an accuracy of reconstruction (by backpropagation) of the autoencoder and a deviation from an accurate reconstruction constitutes a reconstruction error. A set of reconstruction errors occurring across all of the time series processed by an autoencoder 212 is subsequently used to define a statistical model such as a probabilistic model 218 of reconstruction errors for the autoencoder 212.

In one embodiment, the time series processed by an autoencoder 212 by the autoencoder tester 214 is only the time series included in a cluster corresponding to the autoencoder tester 214 (as indicated by the solid line between the clustering process 208 and the autoencoder tester 214). Such an approach is especially appropriate where each cluster is defined on the basis of feature vectors defined themselves by an autoencoder process. In an alternative embodiment, all time series in the training time series can be processed by all autoencoders 212 (as indicated by the broken line between the clustering process 208 and the autoencoder tester 214). This thus provides cross-validation whereby metrics can be evaluated for each autoencoder such as a highest/lowest reconstruction error or an examination of the distribution of reconstruction errors as a basis for defining the probabilistic models 218 for each autoencoder 212.

The reconstruction error information generated by the autoencoder tester 214 is processed by a statistical model generator 216 to generate a probabilistic model 218 for each autoencoder. The statistical model generator 216 is a hardware, software, firmware or combination component for generating a probabilistic model 218 for an autoencoder 212 based on a set of reconstruction errors 214 and/or some summary or characteristics of reconstruction errors provided by the autoencoder tester 214 and/or determined by the statistical model generator 216. For example, in one embodiment, a Gaussian (e.g. normal distribution) is defined each autoencoder 212 based on reconstruction error information for the autoencoder 212.

Subsequently, an aggregator 220 is a hardware, software, firmware or combination component for aggregating the probabilistic models 218 into an aggregate model 222. For example, the aggregate model 222 can be a Gaussian mixture model as will be apparent to those skilled in the art. In an alternative embodiment, the statistical model generator 216 and the aggregator 220 are adapted to generate a Hidden Markov Model.

The aggregate model 222 thus statistically models reconstruction errors for all autoencoders 212 for the training time series and thus can be described as modeling "normal" communication of the devices 202 via the network 200, where "normal" communication is known non-suspicious, non-malicious and/or non-erroneous communication.

Subsequently, on the basis of the aggregate model 222, an anomaly detector 226 is configured to detect an anomaly in network traffic for a device 202 on the network 200. Network traffic (now in a production mode of operation, and thus not part of the traffic used for training) is accessed and/or received by the network analyzer 204 and a time series (a "production" time series) is generated for it by the time series generator 206. The production time series for this network traffic is then received by the anomaly detector 224 which invokes one or more autoencoders 212 for each time window of the time series to determine reconstruction errors for the traffic. The autoencoder(s) 212 invoked can be either a specific autoencoder 212 identified based on an identification of an appropriate cluster for the production time series (e.g. by an application of the clustering process 208 to the time series on the basis of the cluster definitions for the training time series) or can be all autoencoders 212. In particular, where the clustering process for training time series is based on a feature vector determined by an autoencoder, the production time series is processed by an appropriate autoencoder determined based on the same clustering process (to determine an appropriate cluster for the production time series).

Thus, the anomaly detector 224 determines reconstruction error(s) for the production time series (for each time window) and compares these errors with the aggregate model 222 of reconstruction errors to determine if there is a distance exceeding a predetermined threshold. Where such distance between model and actual reconstruction errors exceeds the threshold then an anomaly is identified and reported. Such anomalies can trigger reactive action such as: an identification of one or more devices 202 involved in anomalous communication; preventing a device 202 from communication; disconnecting a device 202; tracking a device 202; increasing a degree of monitoring or scrutiny of a device 202; and other reactive actions as will be apparent to those skilled in the art.

Thus, network traffic, such as data generated by Nedlow tools, can be used to generate time-series network characteristics. A multi-phase approach to anomaly detection is employed according to embodiments of the present disclosure. Traffic is constituted as a time-series on a per-device (e.g. host) basis for each of a series of time windows. An autoencoder can then be employed to inform a clustering algorithm (such as k-means) to separate traffic into clusters. In one embodiment, such clusters can constitute sets of like-devices (e.g. workstations, routers, DNS servers and the like) such that devices having common traffic features are clustered together. Time-series data for each cluster is subsequently used to train a cluster-specific autoencoder. The time-series data for a particular device in a particular time window is processed by a corresponding autoencoder to determine a reconstruction error of the autoencoder for the time-series data.

According to common understanding of those skilled in the art, a large reconstruction error could be considered an indicator of anomalous time-series data. However, this is not necessarily the case for time-series data that is unusual but normal, such as data arising from a DNS appliance. Accordingly, embodiments of the present disclosure employ a statistical model of reconstruction errors generated by the autoencoders. For example, a Gaussian probability distribution of reconstruction errors can be applied such that multiple appliances in a cluster can generate a Gaussian, the combination of which for a plurality of clusters constitutes a Gaussian mixture model. Comparing a reconstruction error for a host in a time period with the Gaussian mixture model offers an opportunity to identify a disparity and an extent of that disparity between data over consecutive time periods for a host and known normal data represented by the Gaussians in the Gaussian mixture model. Disparity exceeding a predetermined threshold can therefore be identified as an anomaly.

FIG. 3 is a flowchart of a method of anomaly detection for network traffic communicated by devices via a computer network according to embodiments of the present disclosure. Initially, at 302, a set of training time series is clustered by a clustering process 208. At 304 an autoencoder 212 is trained for each cluster based on each of a plurality of time windows of each training time series in the cluster. At 306 reconstruction errors for each autoencoder are generated based on the training time series. At 308 a probabilistic model is generated for each autoencoder. At 310 an aggregation of the probabilistic models is generated such that, in use for production time series, reconstruction errors for the production time series can be detected as anomalous based on the aggregation of probabilistic models.

Thus, network traffic, such as data generated by Nedlow tools, can be used to generate time-series network characteristics. Embodiments of the disclosure are effective for identifying anomalies in a time-series by combining specific autoencoding processes for clusters of associated data and a statistical model. The autoencoding process and statistical model are devised following a training process.

In one embodiment, the autoencoding model is periodically recorded after each of a plurality of training iterations so that multiple versions of the model are available, each successive model being trained with more iterations than a previous model. Then, in a training phase, time-series data for a device is processed by all the models at once to generate, for each host, a vector of reconstruction error values (one for each model). A derivative of this vector is evaluated to determine a gradient vector which is used to train a machine learning model such as a one-class support vector machine (SVM) (one-class because only positive examples are used in training—i.e. examples reflecting "normal" traffic). Alternatively, an Isolation Forest or Elliptic Envelope can be employed. For example, where an SVM is trained using positive (normal traffic) examples, the SVM serves to define a distinction between gradient vectors based on time-series for "normal" traffic and gradient vectors based on time-series for potentially anomalous traffic.

Such a resulting SVM constitutes a coarse filter for excluding time-series (and their associated hosts) from consideration in the approach of embodiments of the disclosure described above. In prototyping, 99% of hosts exhibiting "normal" traffic were excluded from processing from a sample of 100,000 hosts while retaining 100% of all anomalous hosts.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device uses the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure.

It will be understood by those skilled in the art that, although the present disclosure—has been described in relation to the above described example embodiments, the disclosure is not limited thereto and that there are many possible variations and modifications which fall within the scope of the claims.

The scope of the present disclosure includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A method of anomaly detection for network traffic communicated by devices via a computer network, the method comprising:

receiving a set of training time series each including a plurality of time windows of data corresponding to network communication characteristics for a first device;

training an autoencoder for a first cluster based on a time series in the first cluster, wherein a state of the autoencoder is periodically recorded after a predetermined fixed number of training examples to define a set of trained autoencoders for the first cluster;

receiving a new time series including a plurality of time windows of data corresponding to network communication characteristics for the first device; for each time window of the new time series, generating a vector of reconstruction errors for the first device for each autoencoder based on testing the autoencoder with data from the time window;

evaluating a derivative of each vector; and training a machine learning model based on the derivatives so as to define a predetermined threshold for identifying subsequent time series for a second device, wherein the subsequent time series identified for the second device are absent anomalous communication in response to determining that a comparison between the vector of reconstruction errors and reconstruction errors detected during the subsequent time series does not exceed the predetermined threshold.

2. A computer system comprising:

a processor and memory storing computer program code for detecting anomalies in network traffic communicated by devices via a computer network, by:

receiving a set of training time series each including a plurality of time windows of data corresponding to network communication characteristics for a first device;

training an autoencoder for a first cluster based on a time series in the first cluster, wherein a state of the autoencoder is periodically recorded after a predetermined fixed number of training examples to define a set of trained autoencoders for the first cluster;

receiving a new time series including a plurality of time windows of data corresponding to network communication characteristics for the first device;

for each time window of the new time series, generating a vector of reconstruction errors for the first device for each autoencoder based on testing the autoencoder with data from the time window;

evaluating a derivative of each vector; and training a machine learning model based on the derivatives so as to define a predetermined threshold for identifying subsequent time series for a second device, wherein the subsequent time series identified for the second device are absent anomalous communication in response to determining that a comparison between the vector of reconstruction errors and reconstruction errors detected during the subsequent time series does not exceed the predetermined threshold.

3. A non-transitory computer-readable storage element storing computer program code to, when loaded into a computer system and executed thereon, cause the computer system to detect anomalies in network traffic communicated by devices via a computer network, by:

receiving a set of training time series each including a plurality of time windows of data corresponding to network communication characteristics for a first device;

training an autoencoder for a first cluster based on a time series in the first cluster, wherein a state of the autoencoder is periodically recorded after a predetermined fixed number of training examples to define a set of trained autoencoders for the first cluster;

receiving a new time series including a plurality of time windows of data corresponding to network communication characteristics for the first device;

for each time window of the new time series, generating a vector of reconstruction errors for the first device for each autoencoder based on testing the autoencoder with data from the time window;

evaluating a derivative of each vector; and training a machine learning model based on the derivatives so as to define a predetermined threshold for identifying subsequent time series for a second device, wherein the subsequent time series identified for the second device are absent anomalous communication in response to determining that a comparison between the vector of reconstruction errors and reconstruction errors detected during the subsequent time series does not exceed the predetermined threshold.

* * * * *

UNITED STATES PATENT AND TRADEMARK OFFICE
CERTIFICATE OF CORRECTION

| | |
|---|---|
| PATENT NO. | : 11,509,671 B2 |
| APPLICATION NO. | : 16/619767 |
| DATED | : November 22, 2022 |
| INVENTOR(S) | : Maximilien Servajean et al. |

It is certified that error appears in the above-identified patent and that said Letters Patent is hereby corrected as shown below:

On the Title Page

On page 2, in Column 2, item (56), under OTHER PUBLICATIONS, Line 20, delete "Reporton" and insert -- Report on --, therefor.

In the Drawings

Sheet 1 of 2, FIG. 2, for Tag "204", Line 1, delete "Analyser" and insert -- Analyzer --, therefor.

Sheet 1 of 2, FIG. 2, for Tag "218", Line 1, delete "proabilistic" and insert -- probabilistic --, therefor.

Sheet 1 of 2, FIG. 2, for Tag "226", Line 2, delete "Determination" and insert -- Detector --, therefor.

In the Specification

In Column 5, Line 15, delete "Nedlow" and insert -- Netflow --, therefor.

In Column 5, Line 65, delete "Nedlow" and insert -- Netflow --, therefor.

In the Claims

In Column 7, Claim 1, Lines 18-22, delete "for each time window of the new time series, generating a vector of reconstruction errors for the first device for each autoencoder based on testing the autoencoder with data from the time window;" and insert the same at Line 19, as a new subpoint.

In Column 7, Claim 1, Line 22, delete "window;" and insert -- window and --, therefor.

Signed and Sealed this
Eleventh Day of April, 2023

Katherine Kelly Vidal
*Director of the United States Patent and Trademark Office*

CERTIFICATE OF CORRECTION (continued)
U.S. Pat. No. 11,509,671 B2

In Column 7, Claim 1, Line 23, delete "evaluating a derivative of each vector; and" and insert the same at Line 22, after "window;" as a continuation point.

In Column 7, Claim 1, Line 23, delete "vector; and" and insert -- vector and --, therefor.

In Column 7, Claim 1, Line 25, delete "threshold" and insert -- threshold filter --, therefor.

In Column 7, Claim 1, Line 27, delete "wherein" and insert -- where --, therefor.

In Column 8, Claim 2, Line 2, delete "window;" and insert -- window and --, therefor.

In Column 8, Claim 2, Line 3, delete "evaluating a derivative of each vector; and" and insert the same at Line 2, after "window;" as a continuation point.

In Column 8, Claim 2, Line 3, delete "vector; and" and insert -- vector and --, therefor.

In Column 8, Claim 2, Line 5, delete "threshold" and insert -- threshold filter --, therefor.

In Column 8, Claim 2, Line 7, delete "wherein" and insert -- where --, therefor.

In Column 8, Claim 3, Line 38, delete "window;" and insert -- window and --, therefor.

In Column 8, Claim 3, Line 39, delete "evaluating a derivative of each vector; and" and insert the same at Line 38, after "window;" as a continuation point.

In Column 8, Claim 3, Line 39, delete "vector; and" and insert -- vector and --, therefor.

In Column 8, Claim 3, Line 41, delete "threshold" and insert -- threshold filter --, therefor.

In Column 8, Claim 3, Line 43, delete "wherein" and insert -- where --, therefor.